United States Patent
Nakagiri et al.

(10) Patent No.: US 6,690,477 B2
(45) Date of Patent: *Feb. 10, 2004

(54) PRINTING CONTROL APPARATUS AND METHOD

(75) Inventors: Koji Nakagiri, Kawasaki (JP); Satoshi Nishikawa, Kawasaki (JP); Yasuo Mori, Tokyo (JP); Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

This patent is subject to a terminal disclaimer.

(21) Appl. No.: 09/941,783

(22) Filed: Aug. 30, 2001

(65) Prior Publication Data

US 2002/0054310 A1 May 9, 2002

Related U.S. Application Data

(62) Division of application No. 09/104,781, filed on Jun. 26, 1998.

(30) Foreign Application Priority Data

Jul. 2, 1997 (JP) .............................................. 9-177278

(51) Int. Cl.$^7$ .............................................. G06F 15/00
(52) U.S. Cl. .................... 358/1.12; 358/1.11; 358/1.14; 358/1.2; 399/401; 399/402; 399/408
(58) Field of Search ................................ 358/1.12, 1.11, 358/1.2, 1.9, 1.14, 1.15, 1.17; 399/401, 402, 408, 410

(56) References Cited

U.S. PATENT DOCUMENTS

| | | | |
|---|---|---|---|
| 4,099,254 A | 7/1978 | Andrews et al. | 364/900 |
| 5,107,338 A | 4/1992 | Saito | 358/296 |
| 5,442,432 A | 8/1995 | Tani | 355/324 |
| 5,872,900 A | 2/1999 | Tsuchitoi | 395/111 |
| 6,313,919 B1 * | 11/2001 | Nakagiri et al. | 358/1.11 |

* cited by examiner

Primary Examiner—Mark Wallerson
Assistant Examiner—Twyler Lamb
(74) Attorney, Agent, or Firm—Fitzpatrick, Cella, Harper & Scinto

(57) ABSTRACT

A host device successively sends print data constituting a plurality of sets of copies of a document to be printed to a printer capable of printing on both sides of printing paper. If each set of copies to be printed consists of an odd number of pages, a blank page is inserted as the reverse side of the last page to make the total number of pages of the set of copies an even number. The print data thus created is sent to the printer as a single job. This makes it possible to prevent the last page of one set of copies and the first page of another set of copies from being printed on the same sheet of paper, thereby allowing each set of copies to be printed as a discrete set independent of other sets. Print job management is performed on the basis of a single print job.

38 Claims, 12 Drawing Sheets

OUTPUT RESULTS
ACCORDING TO PRIOR ART

LAST PAGE OF FIRST SET OF COPIES
AND FIRST PAGE OF SECOND SET OF COPIES
ARE MIXED ON SAME SHEET OF PAPER

OUTPUT RESULTS
ACCORDING TO THE PRESENT INVENTION

BLANK PAGE

PRINTING CONTROL APPARATUS AND METHOD

This application is a division of application Ser. No. 09/104,781, filed on Jun. 26, 1998.

BACKGROUND OF THE INVENTION

This invention relates to a printing control apparatus and method and, more particularly, to a printing control apparatus and method through which a plurality of sets of copies printed on both sides can be obtained as entirely separate sets of copies in a system comprising an information processing apparatus such as a personal computer and a printing apparatus not having a function for printing sets of copies individually.

When an information processing apparatus outputs a plurality of sets of copies of one document which includes text, images or tables, the output can be obtained a specified plurality of sheets at a time per page (per sheet of paper in case of double-sided printing) or the output can be obtained collectively per each set of copies. Methods of implementing this printing on a per-copy basis in which output is obtained collectively per each set of copies include a method carried out by the printing apparatus and a method carried out by the information processing apparatus.

A method of implemented printing on a per-copy basis using a printing apparatus can be of two types. According to the first method, all print data constituting one print job accepted from the information processing apparatus is accumulated in the printing apparatus, which proceeds to repeatedly output the data of this job a number of times equivalent to the specified number of copies desired. The second method utilizes a device such as a sorter that changes over the destination of the output on a per-copy basis. In the case of the first method, it is required that the printing apparatus have a memory or hard disk for accumulating the print data. The second method requires the sorter. In either case, cost is a problem because printing on a per-copy basis is implemented by the printing apparatus. It is generally the case that printers are incapable of printing on such a per-copy basis.

The practice in the prior art, therefore, is to adopt the method in which printing on a per-copy basis is carried out by the information processing apparatus. An example of a conventional approach for realizing printing on a per-copy basis using an information processing apparatus involves transmitting the print data of one print job to the printing apparatus repeatedly a number of times equivalent to the number of copies that should be output. In order to carry out this method, it is required that the application software that executes printing perform processing for the purpose of implementing this method. Consider a case where double-sided printing is performed by printing on per-copy basis implemented by the application according to the prior art. If the number of pages in the document to be printed in this case is odd, a problem which arises is that the first page of the next set of copies of the document will be printed on the reverse side of the last page of the first set of copies of the document. This means that the output product cannot be separated into separate sets of copies.

An example of a method of solving this problem is such that when N copies of a document are to be printed, N print jobs, each of which is for printing one copy of the document, are generated and the N print jobs are transmitted to the printing apparatus. According to this method, printing is performed on the basis of the independent print jobs one copy at a time. As a result, the output product can be separated into discrete sets of copies by discharging the paper from the printing apparatus at the boundary between mutually adjacent sets of copies, i.e., at the moment one job ends.

In a case where a print job is generated per each set of copies, however, each print job must be canceled or suspended in order to cancel or suspend the printing of a document currently being printed.

Further, in a case where a document is to be printed from a printing apparatus shared on a network, it is possible that a print job that has been transmitted from another client will be inserted between print jobs which are performed to print a plurality of copies of a document. This means that one must check to determine whether the output product of another client has been included in the output product consisting of the plurality of copies. In addition, if another client also is printing out a plurality of copies of a document, print jobs the number of which is equivalent to the number of output copies of each document will be generated. As a result, the copies of the two types of documents will be discharged into the catch tray of the printing apparatus in a mixed state, though the copies of each document will be discharged in individual sets. It is obvious that if clients desiring to print plural copies of documents using the same printing apparatus increase, arranging the output products will be an extremely complicated task.

SUMMARY OF THE INVENTION

Accordingly, an object of the present invention is to provide a printing control apparatus and method for controlling a printing apparatus that does not possess a function for printing sets of copies individually, wherein when print data consisting of an odd number of pages is printed by the printing apparatus using double-sided printing, it is so arranged that the boundary between one set of copies and another will not fall on the same sheet of paper, and printing is performed in such a manner that it is possible for the output product to be separated into discrete sets of copies.

Another object of the present invention is to provide a printing control apparatus and method in which printing on a per-copy basis, wherein plural sets of copies of a document are printed set by set, is implemented in a single print job, thereby making it possible to manage printout even of a plurality of sets of copies by means of a single print job, and in which other print jobs can be printed without the printouts of these other print jobs intruding upon the printing of one job in individual sets of copies.

According to the present invention, the foregoing object is attained by providing a printing control apparatus connected to a printing apparatus which prints on front and reverse sides of a printing medium in order, comprising storage means for storing print data of a document to be printed, and sending means for reading the print data out of the storage means, inserting a blank page on the reverse side of the printing medium if the final page of the print data falls on the front side of the printing medium, and sending this print data to the printing apparatus, wherein the sending means reads the print data out of the storage means repeatedly a number of times equivalent to a specified number of copies to be printed, and sends this data to the printing apparatus.

Further, the foregoing objects of the present invention are attained by providing a printing control method for performing printing by a printing apparatus which prints on front and reverse sides of a printing medium in order, comprising a judging step of reading print data out of storage means that stores print data of a document to be printed, and judging whether the final page of the print data falls upon the front side of the printing medium, a blank-page inserting step of inserting a blank page on the reverse side of the printing medium if the final page of the print data falls on the front side of the printing medium, and a sending step of sending this print data to the printing apparatus, wherein the judging step and sending step are repeated a number of times equivalent to a specified number of copies to be printed.

The present invention further provides a printing system comprising a printing control apparatus and a printing apparatus, the printing control apparatus including storage means for storing print data of a document to be printed, and sending means for reading the print data out of the storage means, inserting a blank page on a reverse side of a printing medium if the final page of the print data falls on a front side of the printing medium, and sending this print data to the printing apparatus, and the printing apparatus prints on front and reverse sides of the printing medium in order, wherein the sending means reads the print data out of the storage means repeatedly a number of times equivalent to a specified number of copies to be printed, and sends this data to the printing apparatus.

The present invention further provides a computer readable storage medium storing a program by which the following means are implemented by a computer connected to a printing apparatus which prints on front and reverse sides of a printing medium in order: storage means for storing print data of a document to be printed, and sending means for reading the print data out of the storage means, inserting a blank page on the reverse side of the printing medium if the final page of the print data falls on the front side of the printing medium, and sending this print data to the printing apparatus repeatedly a number of times equivalent to a specified number of copies to be printed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments to which the present invention is applied will now be described.

First Embodiment

Figure 1:
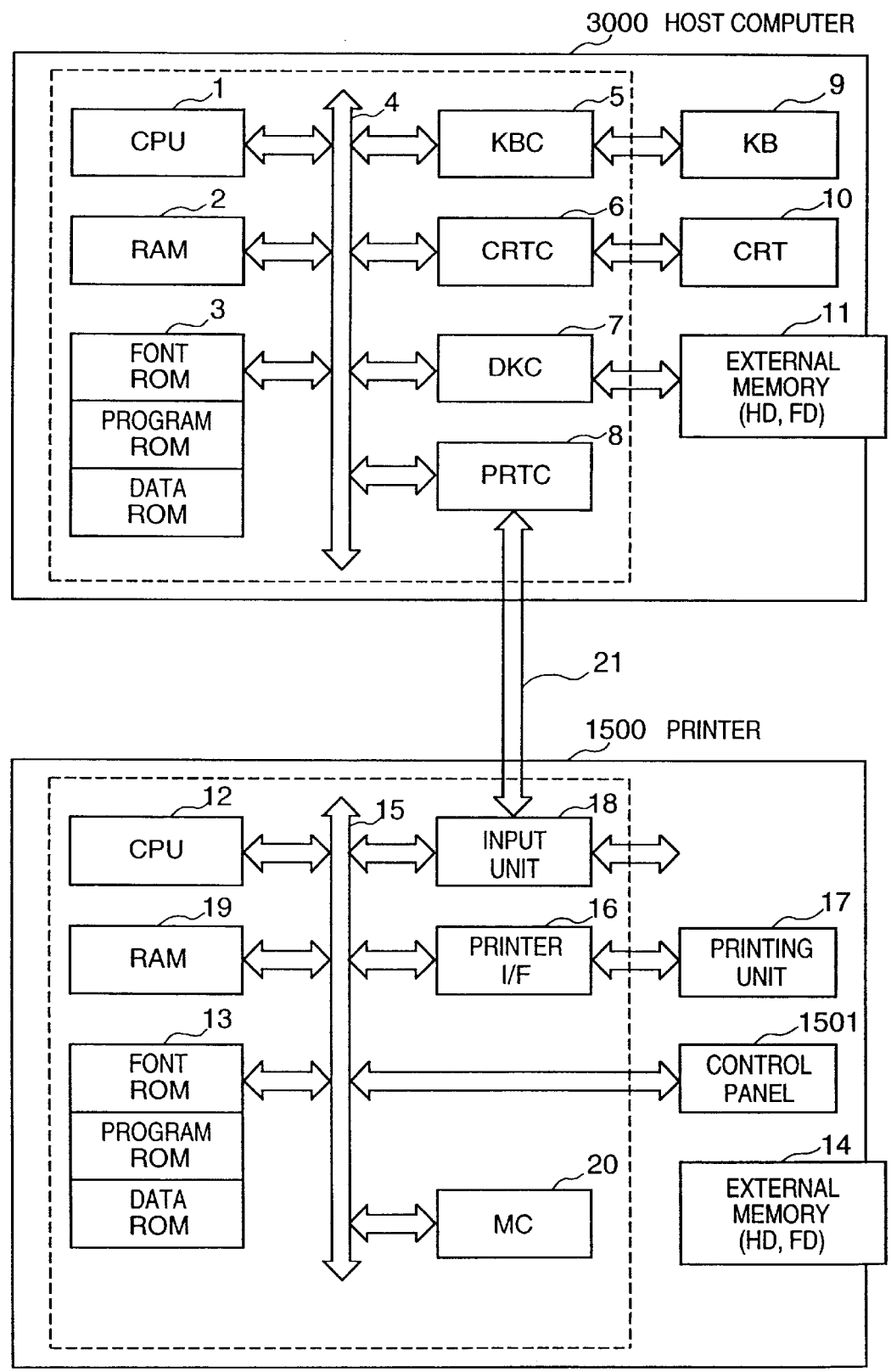
FIG. 1 is a block diagram of a printing system according to an embodiment of the present invention.

FIG. 1 is a block diagram showing a printer control system illustrating an embodiment of the present invention. It should be noted that as long as the functions of the present invention are executed, the arrangement of the invention may be a stand-alone device, a system comprising a plurality of devices or a system in which processing is executed upon making a connection via a network such as a LAN or WAN.

Configuration of Printing System

The system shown in FIG. 1 includes a host computer 3000 having a CPU 1 which, on the basis of a programming ROM in a ROM 3 or a document processing program that has been stored in an external memory 11, executes the processing of a document containing mixed objects such as graphics, images, characters and tables (inclusive of spreadsheets, etc.). The CPU 1 performs overall control of various devices connected to a system bus. An operating system, which is the control program of the CPU 1, is stored in a program ROM of the ROM 3 or in the external memory 11. Font data used when the above-mentioned document processing is executed is stored in a font ROM of the ROM 3 or in the external memory 11. Various data used when the above-mentioned document processing is executed is stored in a data ROM of the ROM 3 or in the external memory 11. The RAM 2 functions as the main memory and work area of the CPU 1.

A keyboard controller (KBC) 5 controls inputs from a keyboard 9 and pointing device, which is not shown. A CRT controller (CRTC) 6 controls the display on a CRT display (CRT) 10. A disk controller (DKC) 7 controls access to the external memory 11, such as a hard disk (HD) or floppy disk (FD), which stores a booting program, various applications, font data, user files, edited files and a program (referred to as a "printer driver" below) for generating printer control commands. A printer controller (PRTC) 8, which is connected to a printer 1500 via a bidirectional interface 21, executes processing for controlling communication with the printer 1500.

The CPU 1 executes processing to rasterize outline fonts in a RAM area, provided in, say, the RAM 2, that stores display information, and implements a WYSIWYG (What You See I What You Get) function using the CRT 10. Further, on the basis of commands designated by a mouse cursor (not shown) on the CRT 10, the CPU 1 opens various windows that have been registered and executes a variety of data processing. When printing is executed, the user opens a window relating to printing settings, sets the printer and sets a printing processing method in regard to the printer driver, the setting including the selection of a printing mode.

The printer 1500 has a CPU 12 which, on the basis of a control program stored in a program ROM of a ROM 13 or a control program stored in an external memory 14, outputs an image signal, which serves as output information, to a printing unit (printer engine) 17 connected to a system bus 15. A control program of the CPU 12 is stored in a program ROM of the ROM 13. Font data used when the above-mentioned output information is generated is stored in a font ROM of the ROM 13. In case of a printer not equipped with the external memory 14 such as a hard disk, information utilized in the host computer is stored in a data ROM of the ROM 13.

The CPU 12, which can execute processing for communicating with the host computer via an input unit 18, is adapted so as to be capable of notifying the host computer 3000 of information internal to the printer 1500. A RAM 19, which functions as the main memory and work area of the CPU 12, is so adapted that memory capacity can be expanded by optional RAM connected to add-on memory, not shown. The RAM 19 is used as an area for expanding output information, as an area for storing environment data, and as a NVRAM. The external memory 14, such a hard disk (HD) or IC card, has its access controlled by a memory controller (MC) 20. The external memory 14, which is connected to the printer as an option, stores font data, an emulation program and form data, etc. Further, a control panel 1501 has an array of operation switches and LED indicators.

The external memory is not limited to a single memory. An arrangement maybe adopted in which a plurality of optional cards storing optional fonts to supplement the internal fonts or a plurality of external memories storing programs for interpreting printer control languages of different language systems can be connected to the apparatus. Furthermore, the external memory 14 may have an NVRAM (not shown) for storing printer mode setting information from the control panel 1501.

Figure 10:
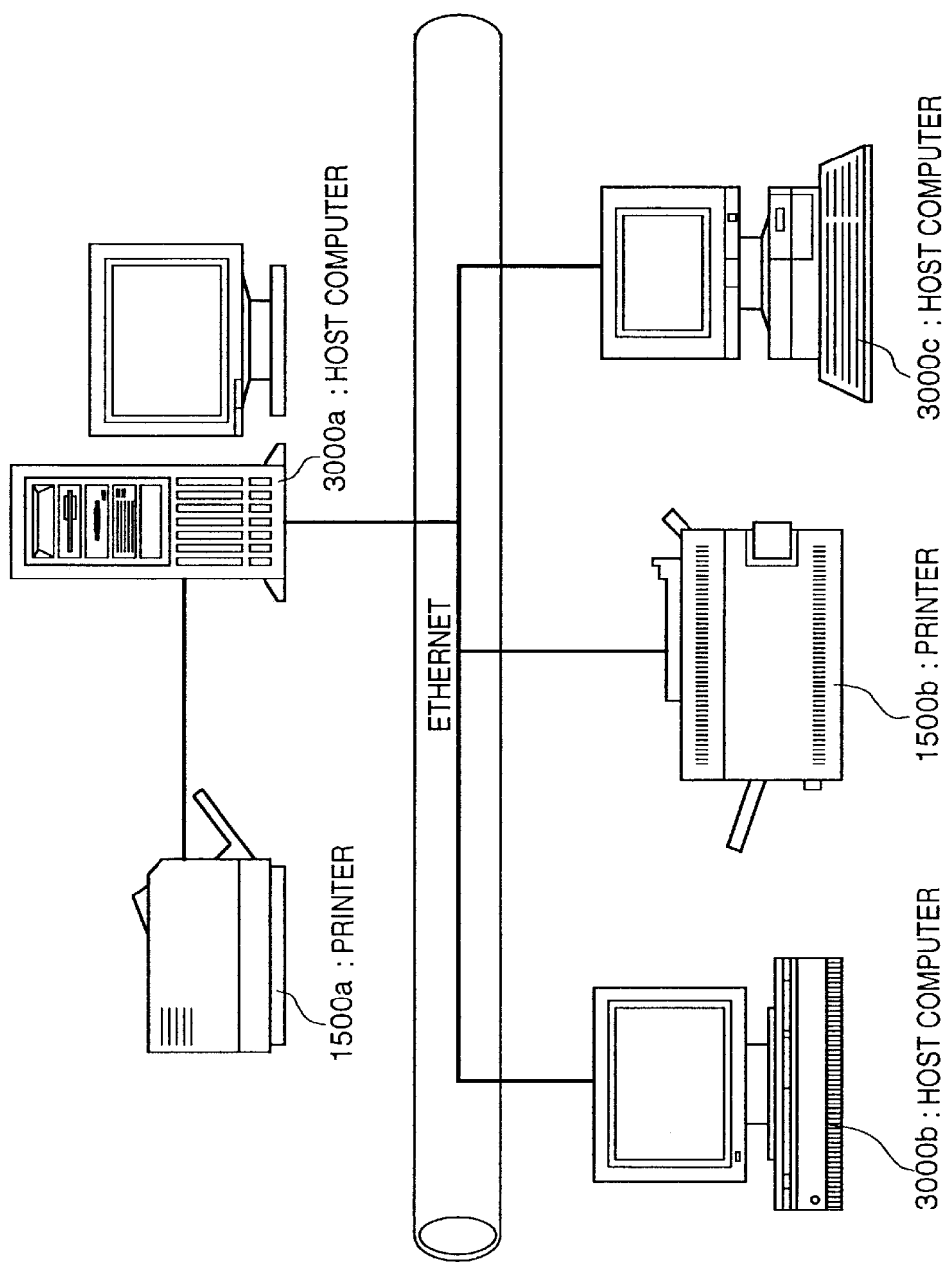
FIG. 10 is a diagram showing the manner in which host computers and printers are connected.

FIG. 10 is a diagram illustrating the manner in which the host computer 3000 and printer 1500 are connected. The aforementioned FIG. 1 is a block diagram for a case where the host computer 3000 and printer 1500 are connected directly by the bidirectional interface 21. FIG. 10 illustrates a case where the connection is made via a network. A printer 1500a in FIG. 10 is connected directly to a host computer 3000a, which manages the print jobs of the printer 1500a. The host computer 3000a allows the printer 1500a to be shared so that the printer 1500a can be utilized by other host computers on the network. This sharing makes it possible for host computers 3000b and 3000c to utilize the printer 1500a via the network.

The printer 1500b is connected directly to the network and has its print jobs managed by the host computer 3000b. The host computer 3000b allows the printer 1500b to be shared so that the printer 1500b can be utilized by other computers on the network. This sharing makes it possible for host computers 3000a and 3000c to utilize the printer 1500b via the network.

Figure 2:
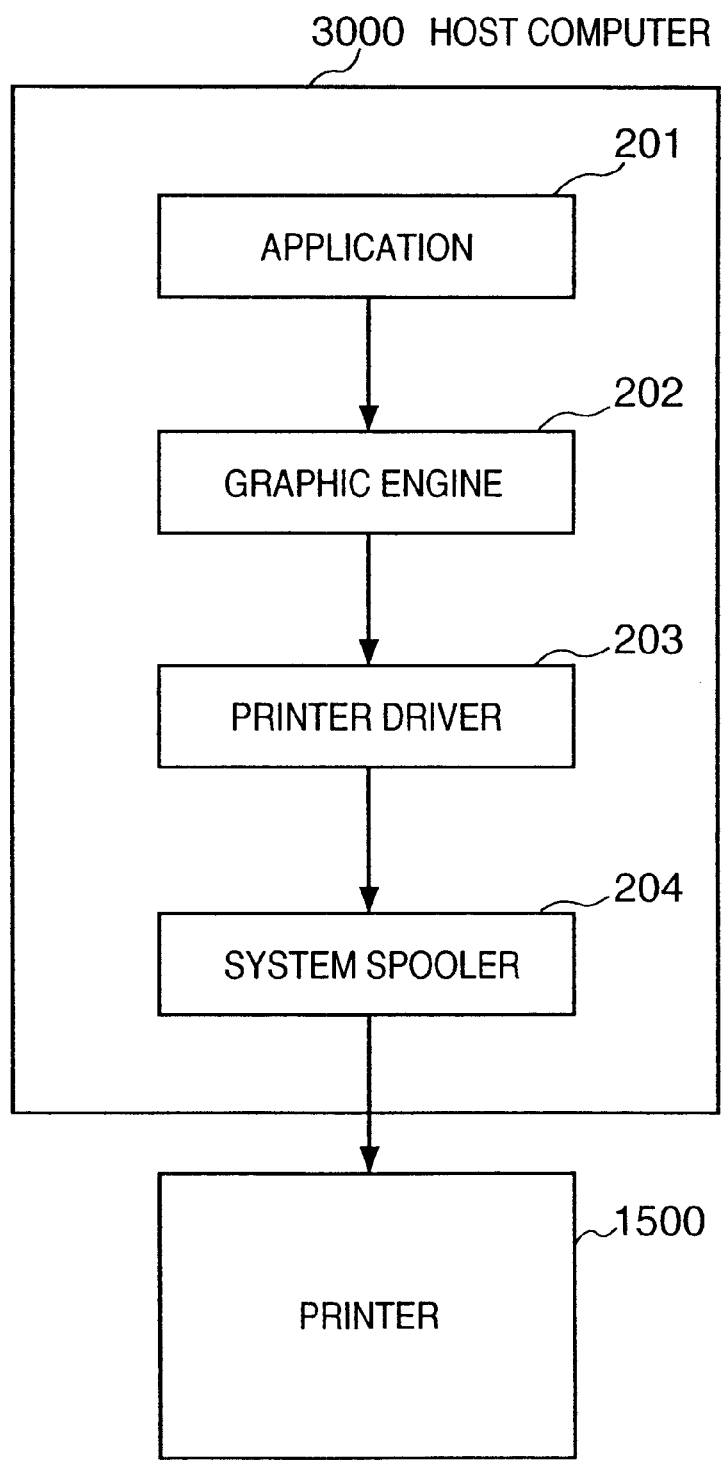
FIG. 2 is a diagram showing the generation of typical print data in a host computer.

FIG. 2 is a diagram showing typical printing processing executed by the host computer connected to a printing apparatus directly or via a network. An application 201, graphic engine 202, printer driver 203 and system spooler 204 are preserved in the external memory 11 as files. These are program modules which, when they are to be executed, are loaded in the RAM 2 and executed by the operating system and by modules which utilize these modules. The application 201 and the printer driver 203 can be stored on a floppy disk or CD-ROM of the external memory 11 or can be stored on the hard disk of the external memory 11 via a network, not shown.

The application 201 preserved in the external memory 11 can be executed upon being loaded in the RAM 2. When the application 201 performs printing using the printer 1500, output (plotting) is performed utilizing the graphic engine 202 capable of being executed upon being similarly loaded in the RAM 2. The graphic engine 202 loads the printer driver 203, which is prepared for each printing apparatus, from the external memory 11 to the RAM 2 and converts the output from the application 201 to printer control commands using the printer driver 203. The printer control commands obtained by the conversion are output to the printer 1500 via the interface 21 by way of the system spooler 204 that has been loaded into the RAM 2 by the operating system.

Configuration of Printing Control System

Figure 3:
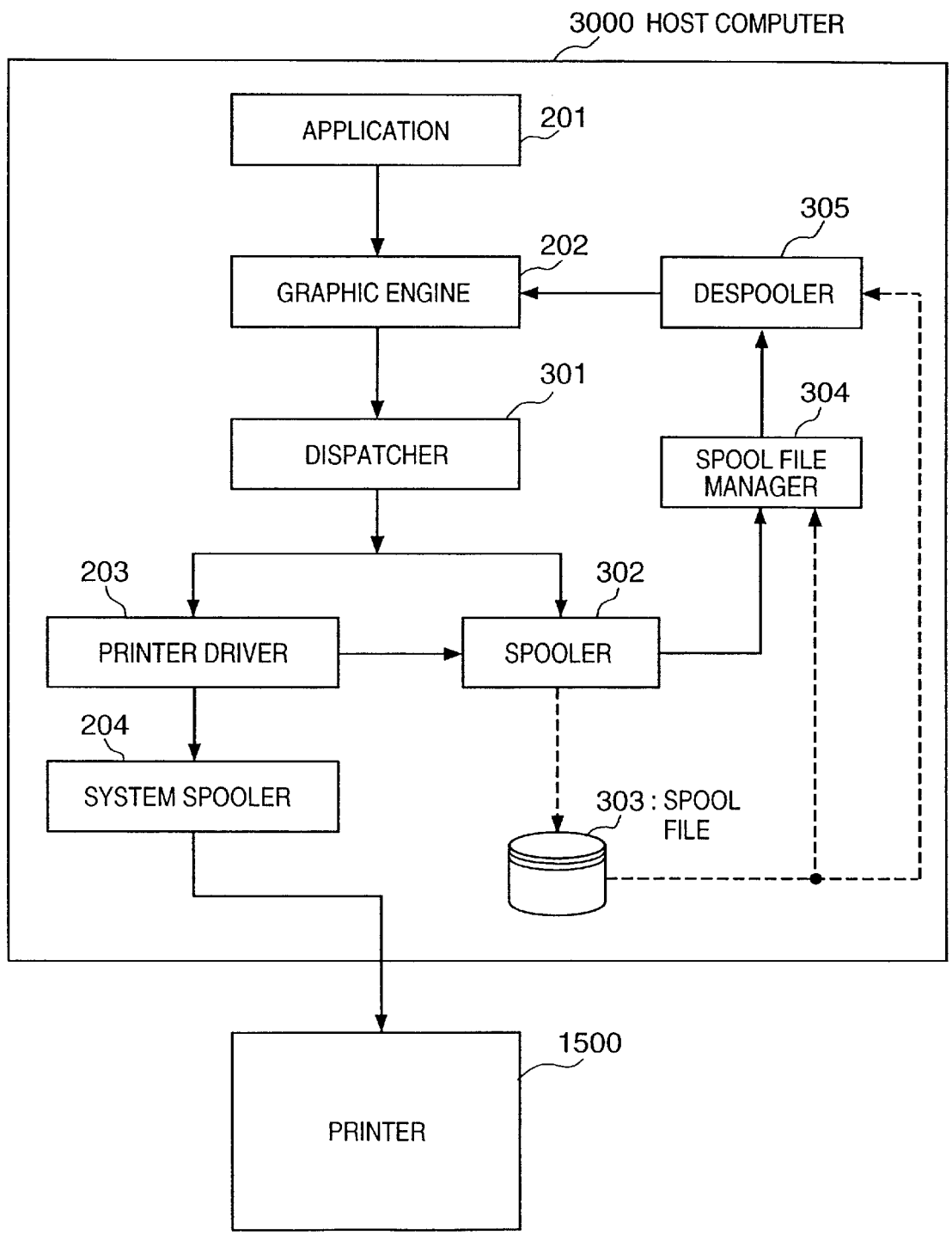
FIG. 3 is a diagram showing the generation of print data, which is an expansion of FIG. 2, for generating intermediate codes.

The printing system according to this embodiment has an arrangement which, as shown in FIG. 3, spools print data from the application temporarily by intermediate code data. This arrangement is provided in addition to the system comprising the printer and host computer shown in FIG. 2.

FIG. 3 is an expansion of the system of FIG. 2. Here a spool file 303 comprising intermediate codes is generated temporarily when a print instruction is sent from the graphic engine 202 to the printer driver 203. In the system of FIG. 2, the application 201 is freed from printing processing at the moment the printer driver 203 finishes converting all print instructions from the graphic engine 202 to printer control commands. In the system of FIG. 3, on the other hand, the application 201 is freed from printing processing at the moment a spooler 302 converts all print instructions to intermediate code data and outputs the code data to a spool file 303. Ordinarily the latter requires a shorter period of time. Further, in the system shown in FIG. 3, the content of the spool file 303 can be manipulated. As a result, it is possible to realize functions not possessed by the application. For example, the print data from the application can be subjected to size enlargement and reduction so that a plurality of pages may be printed upon being reduced to the size of a single page.

In order to attain these objectives, the system of FIG. 2 is expanded in such a manner that print data is spooled in the form of intermediate codes as shown in FIG. 3. In order to manipulate the print data, the operator usually makes settings using a setting screen provided by the printer driver 203 and the printer driver 203 saves the set content in the RAM 2 or external memory 11.

The details of FIG. 3 will now be described. As illustrated in FIG. 3, the processing scheme thus expanded is such that print instructions from the graphic engine 202 are accepted by a dispatcher 301. In a case where a print instruction that the dispatcher 301 has accepted from the graphic engine 202 is a print instruction that the application 201 issued to the graphic engine 202, the dispatcher 301 loads the spooler 302, which has been stored in the external memory 11, into the RAM 2 and sends the print instruction to the spooler 302 and not the printer driver 203.

The spooler 302 converts the accepted print instruction to an intermediate code and outputs the code to a spool file 303. Further, the spooler 302 acquires the manipulation settings, which relate to print data set in the printer driver 203, from the printer driver 203 and preserves the data in the spool file 303. Though the spool file 303 is generated as a file in the external memory 11, the file may be generated in the RAM 2. Furthermore, the spooler 302 loads a spool file manager 304, which has been stored in the external memory 11, into the RAM 2 and notifies the spool file manager 304 of the status of spool file generation. In accordance with the content of the manipulation settings relating to the print data preserved in the spool file 303, the spool file manager 304 subsequently determines whether printing can be performed.

When the spool file manager 304 has judged that printing can be performed utilizing the graphic engine 202, the spool file manager 304 loads a despooler 305, which has been stored in the external memory 11, into the RAM 2 and instructs the despooler 305 to perform printing of the intermediate codes described in the spool file 303.

In accordance with the content of manipulation settings included in the spool file 303, the despooler 305 manipulates the intermediate codes contained in the spool file 303 and outputs them again via the graphic engine 202.

In a case where a print instruction which the dispatcher 301 receives from the graphic engine 202 is a print instruction sent from the despooler 305 to the graphic engine 202, the dispatcher 301 sends the print instruction to the printer driver 203 and not the spooler 302.

The printer driver 203 generates a print control command in dependence upon the received print instruction and outputs the command to the printer 1500 via the system spooler 204 and bidirectional interface 21.

Construction of Printer

Figure 9:
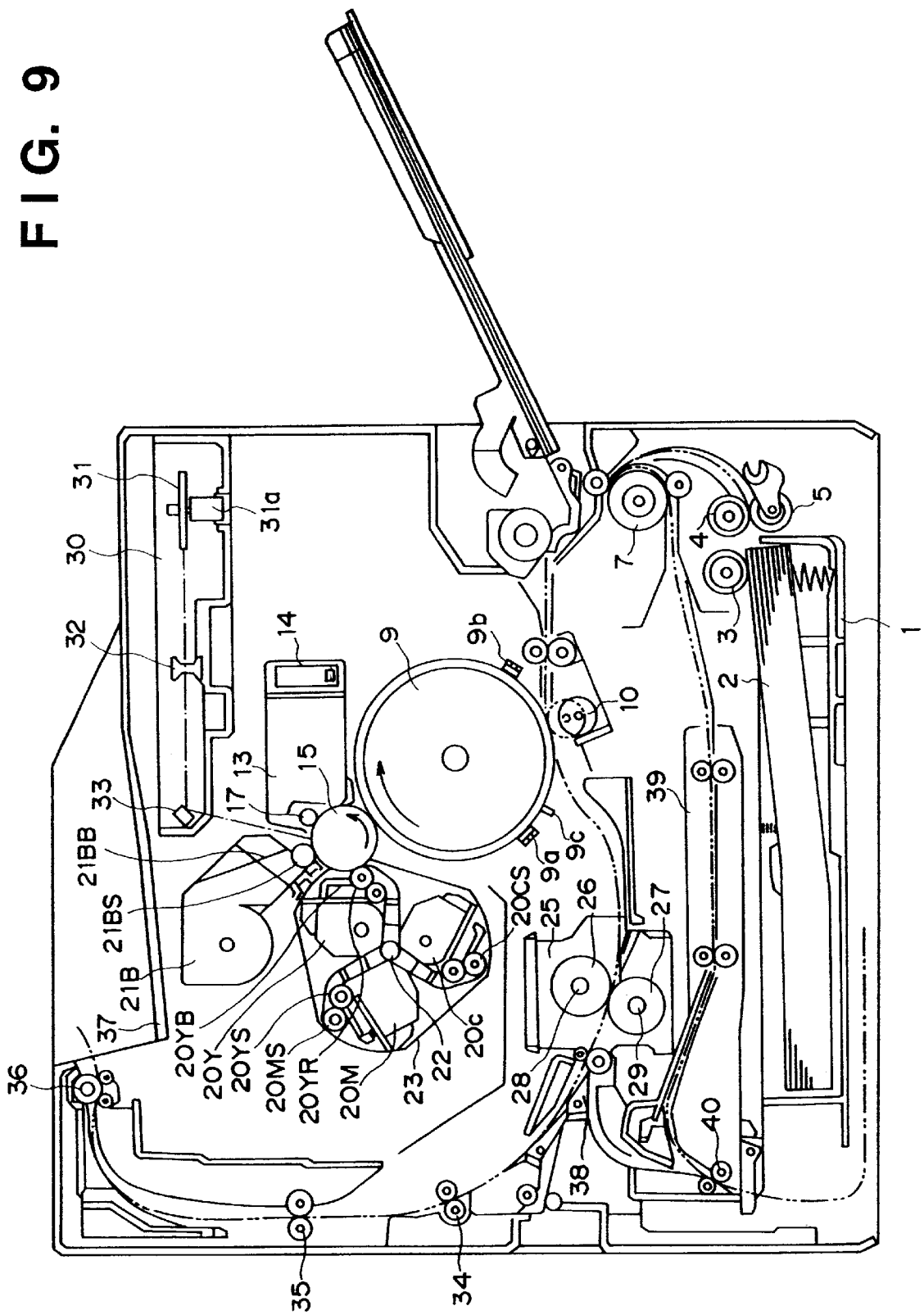
FIG. 9 is a sectional view of a laser printer having a double-sided printing unit.

FIG. 9 is a sectional view illustrating a color laser printer having a double-sided printing function and serving as one example of the printer 1500.

The printer is so adapted that a laser beam, which has been modulated by image data of color components obtained based upon print data entered from the host computer 3000, is scanned across a photosensitive drum 15 by a polygon mirror 31 to form electrostatic latent images. Visible images are obtained by developing the latent images using toner and the visible images for all colors are transferred to an intermediate transfer body 9 to obtain a full-color visible image. The visible color image is transferred to and fixed on a transfer medium 2. The image forming section that performs the above-described control is constituted by a drum unit 13 having the photosensitive drum 15, a primary charging unit having a contact-type charging roller 17, a cleaning unit, a developing unit, the intermediate transfer body 9, a paper cassette 1, a feed unit including various rollers 3, 4, 5, 7, a transfer unit having a transfer roller 10 and a fixing unit 25.

The drum unit 13 is constructed by integrating the photosensitive drum (photoreceptor) 15 and a cleaner container 14 having a cleaning mechanism that serves also as the holder of the photosensitive drum 15. The drum unit 13 is supported on the printer proper in a freely attachable and detachable manner and is capable of being replaced with ease when the photosensitive drum 15 reaches the end of its service life. The photosensitive drum 15 includes an aluminum cylinder the peripheral surface of which is coated with an organic photoconductor layer and is rotatably supported on the cleaner container 14. The photosensitive drum 15 is rotated by transmission of the driving force from a drive motor (not shown), the drive motor rotating the photosensitive drum 15 counter-clockwise in conformity with the image forming operation. The laser beam transmitted from a scanner 30 is made to selectively expose the surface of the photosensitive drum 15, thereby forming the latent image. The scanner 30 has a motor 31a by which the polygon mirror is rotated in synchronization with the horizontal synchronizing signal of the image signal, whereby the modulated laser beam is reflected to irradiate the photosensitive drum 15 via a lens 32 and reflecting mirror 33.

In order to make the electrostatic latent image a visible image, the developing unit has three color developing devices 20Y, 20M, 20C for developing the colors yellow (Y), magenta (M) and cyan (C), respectively, and a single black developing unit 21B for developing the color black (B). The color developing devices 20Y, 20M, 20C and black developing unit 21B are provided with sleeves 20YS, 20MS, 20CS and 21BS, respectively, and with coating blades 20YB, 20MB, 20CB and 21BB, respectively, which are in pressured contact with the outer peripheries of the respective sleeves 20YS, 20MS, 20CS, 20BS. The three color developing devices 20Y, 20M, 20C are further provided with coating rollers 20YR, 20MR, 20CR.

The black developer 21B is mounted on the printer proper in a freely attachable and detachable manner. The color developing devices 20Y, 20M, 20C are mounted, in a freely attachable and detachable manner, on a developing rotary 23 which rotates about a rotary shaft 22.

The sleeve 21BS of the black developing device 21B is spaced away from the photosensitive drum 15 by a minute distance of, say, 300 $\mu$m. The black developing device 21B transports toner by an internally provided feed member and an electric charge is applied to the toner by frictional charging in such a manner that the coating blade 21BB will coat the outer periphery of the sleeve 21B, which rotates in the clockwise direction, with the toner. Further, by applying a developing bias to the sleeve 21BS, the toner on the photosensitive drum 15 is developed in conformity with the electrostatic latent image, whereby a visible image is formed on the photosensitive drum 15 by the black toner.

The three color developing devices 20Y, 20M, 20C rotate along with the developing rotary 23 at the time of image formation so that the prescribed ones of the sleeves 20YS, 20MS, 20CS are made to oppose the surface of the photosensitive drum 15 across minutely small distances of 300 $\mu$m. As a result, the prescribed ones of the color developing devices 20Y, 20M, 20C are stopped at a developing position relative to the photosensitive drum 15 so that a visible image is formed on the photosensitive drum 15.

When the color image is formed, a developing process is executed whereby the developing rotary 23 is rotated per each revolution of the intermediate transfer body 9 so that development is performed by the yellow developing device 20Y, magenta developing device 20M, cyan developing device 20C and black developing device 20Y, in the order mentioned. The intermediate transfer body 9 makes four revolutions to successively form visible images using the yellow, magenta, cyan and black toners. As a result, a full-color visible image is formed on the intermediate transfer body 9.

The intermediate transfer body 9 is adapted to contact the photosensitive drum 15 and rotates attendant upon rotation of the photosensitive drum 15. The intermediate transfer body 9 rotates clockwise at the time of formation of the color image and receives transfer of the four visible images from the photosensitive drum 15. At the time of image formation, the transfer roller 10, described later, contacts the intermediate transfer body 9 and transports the transfer medium 2 embraced by the intermediate transfer body 9 and the transfer roller 10, whereby the visible color images on the intermediate transfer body 9 are transferred to the transfer medium 2 simultaneously. Disposed about the periphery of the intermediate transfer body 9 are a TOP sensor 9a and an RS sensor 9b, which sense the position of the intermediate transfer body 9, and a density sensor 9c for sensing the density of the toner image that has been transferred to the intermediate transfer body 9.

The transfer roller 10 has a transfer charging device supported so as to be capable of contacting and separating from the photosensitive drum 15. The transfer roller 10 is constructed by winding a foamed elastic body of intermediate resistance on a metal shaft.

As indicated by the solid line in FIG. 12, the transfer roller 10 is spaced away from the intermediate transfer body 9 so that the visible color images will not be disturbed during the multiple transfer of the visible color images to the intermediate transfer body 9. After the four visible color images have been formed on the intermediate transfer body 9, the transfer roller 10 is moved upward to the position indicated by the phantom line by a cam member (not shown) in conformity with the timing at which the visible color images are transferred to the transfer medium 2. As a result, the transfer roller 10 is brought into pressured contact, at a prescribed force, with the intermediate transfer body 9 via the intermediary of the transfer medium 2. In addition, a bias voltage is applied so that the visible color images on the intermediate transfer body 9 are transferred to the transfer medium 2.

The fixing unit 25, which fixes the transferred visible color images while transporting the transfer medium 2, has a fixing roller 26 for heating the transfer medium 2, and a pressurizing roller 27 for bringing the transfer medium 2 into pressured contact with the fixing roller 26. The fixing roller 26 and the pressurizing roller 27 are formed to be hollow and internally incorporate heaters 28, 29, respectively. That is, the transfer medium 2 bearing the visible color images is transported, heated and pressurized by the fixing roller 26 and pressurizing roller 27, whereby the toners are fixed on the surface of the transfer medium 2.

The fixed transfer medium 2 is subsequently ejected to a discharge unit by discharge rollers 34, 35, 36, whereby the image forming operation is completed.

Cleaning means cleans residual toner from the photosensitive drum 15 and intermediate transfer body 9. Toner waste left after the visible toner images formed on the photosensitive drum 15 are transferred to the intermediate transfer body 9 or toner waste left after the four visible color images formed on the intermediate transfer body 9 are transferred to the transfer medium 2 is collected in the cleaner container 15.

The transfer medium (printing paper) 2 to be printed on is extracted from the paper cassette 1 by a feed roller 3 and is transported so as to be embraced by the intermediate transfer body 9 and transfer roller 10, whereby a color toner image is recorded on the paper. The toner image is then fixed by passing the paper through the fixing unit 25. In case of single-sided printing, a guide 38 defines a transport path that leads the printing paper to the overlying paper discharge section. If the printing paper is to undergo double-sided printing, the guide 38 forms a path that leads the printing paper to the underlying double-sided printing unit.

Printing paper that has been introduced to the double-sided printing unit first is fed into an area below the cassette 1 (see the transport path indicated by the two-dot broken line) by a transport roller 40, after which the printing paper is transported in the reverse direction and sent to a duplex tray 39. The printing paper received in the duplex tray 39 will be upside down relative to the printing paper stacked in the paper cassette 1 and its orientation in terms of the transport direction will have been reversed. By performing transfer and fixing of a toner image again under these conditions, double-sided printing can be performed.

Double-sided Printing of Individual Sets of Copies

Figure 4A:
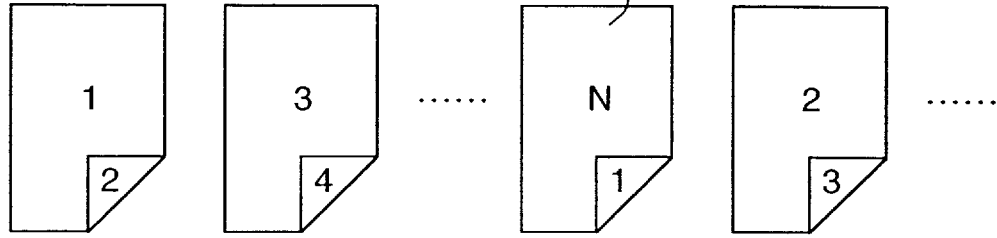
FIG. 4A is a diagram illustrating an example of an output, according to the prior art, obtained by double-sided printing on a per-copy basis.
Figure 4B:
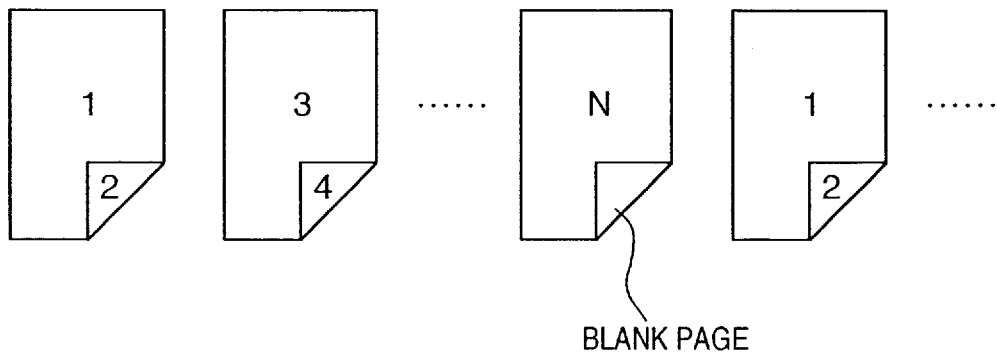
FIG. 4B is a diagram illustrating an example of an output, by a printing system according to an embodiment of the present invention, obtained by double-sided printing on a per-copy basis.

FIGS. 4A and 4B illustrate examples of outputs obtained by double-sided printing on a per-copy basis according to a conventional application and according to the printing control system of this invention, respectively. The output result according to the prior art is such that if the total number N of pages of a set of copies of a document is odd, the first page of the second set of copies will be printed on the reverse side of the last page of the first set of copies. As a result, the output product cannot be divided into separate sets of copies. Further, in regard to the front and reverse sides of each sheet of paper in first and second sets of copies, the combination of pages printed on these sheets will not be the same for the first and second sets of copies.

By contrast, the output result according to this embodiment is such that if the total number N of pages of a set of copies of a document is odd, a blank page is inserted as the reverse side of the last sheet of paper. As a result, it is so arranged that pages belonging to separate sets of copies will not be placed on front and reverse sides of the same sheet of paper, thus making it possible to separate an output product into discrete sets of copies. The combination of pages printed on the front and reverse sides of each sheet of paper will be the same in all sets of copies.

Figure 11A:
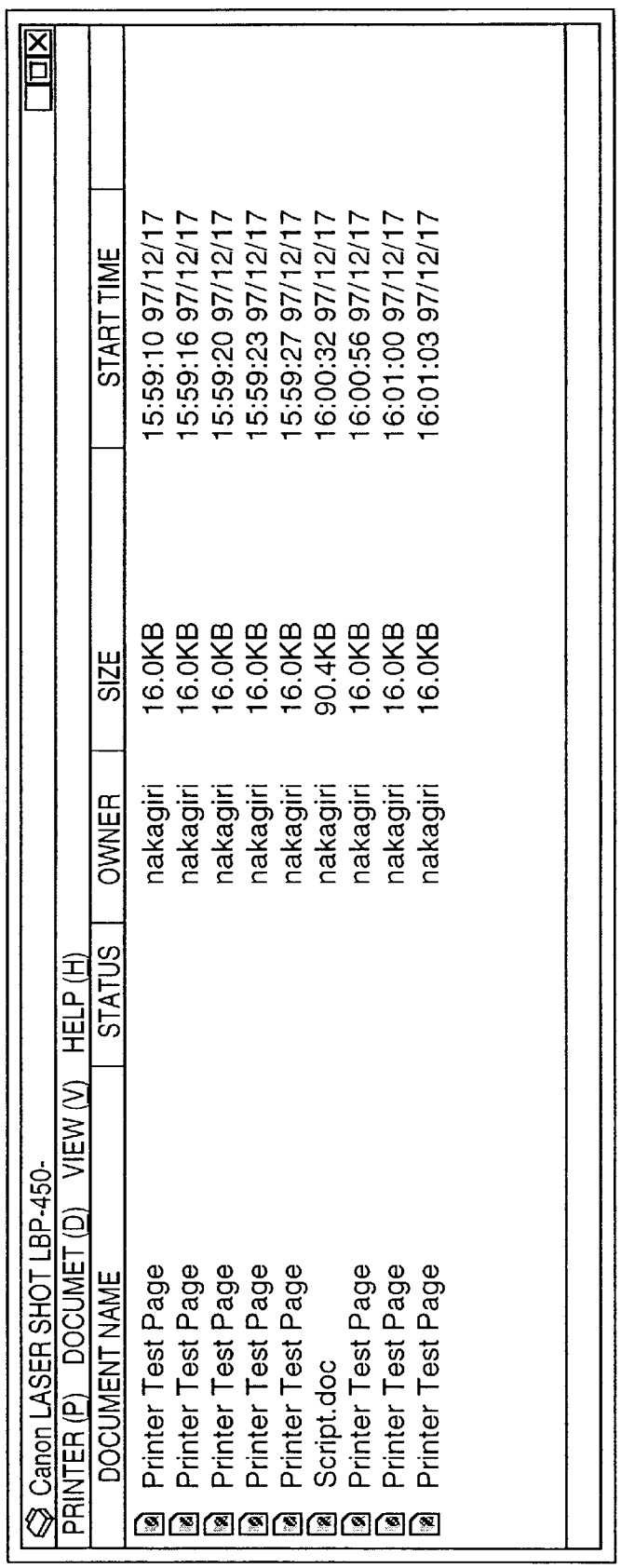
FIG. 11A is a diagram illustrating an example of the status of a job queue when the printing on a per-copy basis is performed according to the prior art.
Figure 11B:
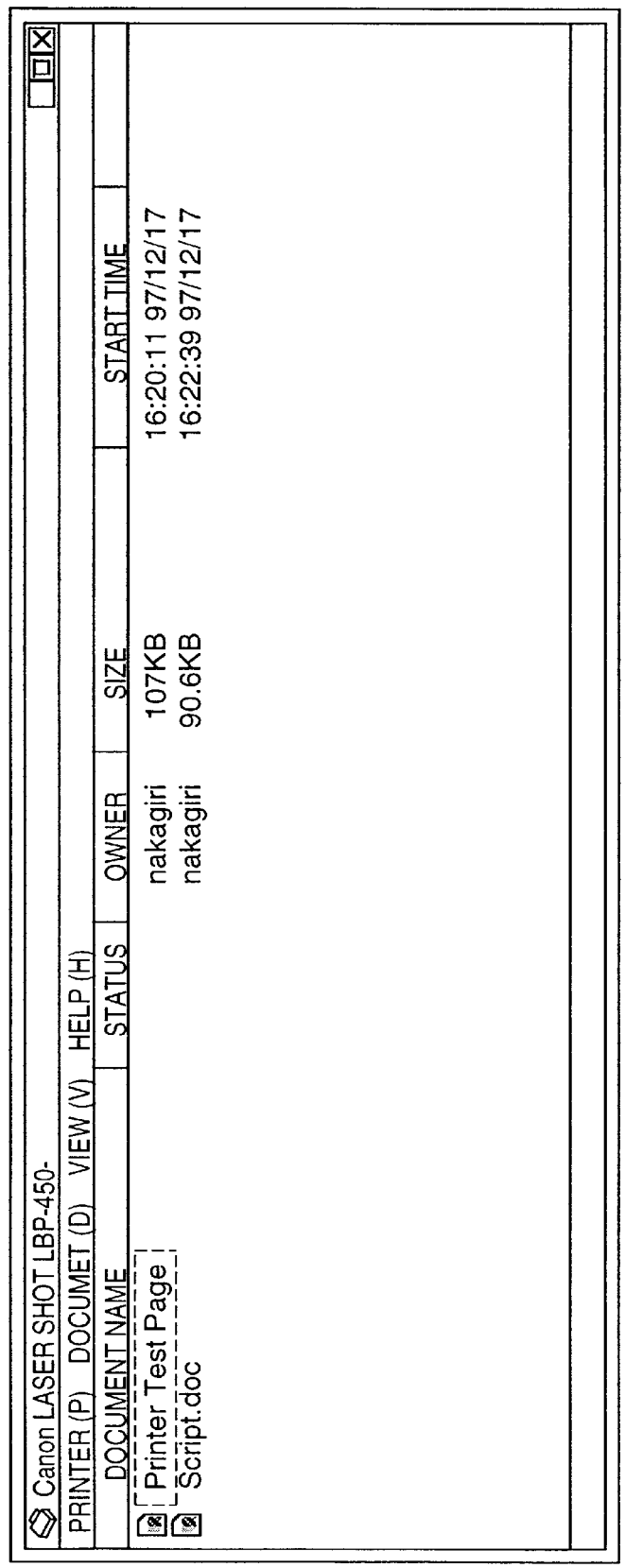
FIG. 11B is a diagram illustrating an example of the status of a job queue when the printing on a per-copy basis is performed by the printing system according to the embodiment of the present invention.

FIGS. 11A and 11B are diagrams illustrating examples of print job queues when printing on a per-copy basis. FIG. 11A illustrates the status of a print job queue in a case where eight print jobs have been generated in order to print eight copies of document "Printer Test Page". In order to cancel or suspend this printing operation, it is necessary that an indication to cancel or suspend be made for each one of the eight print jobs. Further, is should be noted that another print job "Script.doc" has been inserted between the fifth and sixth copies. Since the printing of eight copies is being performed by eight print jobs using a single printer, this situation can occur when another print job is sent to the printer at approximately the same time as these print jobs.

FIG. 11B illustrates an example of a print job queue in the printing system according to this embodiment. In order to execute the printing of a plurality of copies by a single print job, only one job is displayed in the print job queue of FIG. 11B. Here the canceling or suspending of printing can be executed by performing an operation in regard to the single print job. Another print job cannot be inserted between print local print jobs, thereby assuring that different documents will not be mixed.

Printing Control Procedure

Processing for printing on a per-copy basis at the time of double-sided printing will now be described in detail with reference to FIGS. 5 and 6, which illustrate control procedures executed by the spool file manager 304.

When printing starts from the application 201, the spooler 302 acquires the printing settings from the printer driver 203 and registers the settings in the spool file 303. If the spool file manager 304 has not been activated, the spooler 302 loads the spool file manager in the RAM 2 and notifies the spool file manager of the fact that printing has started.

Figure 5:
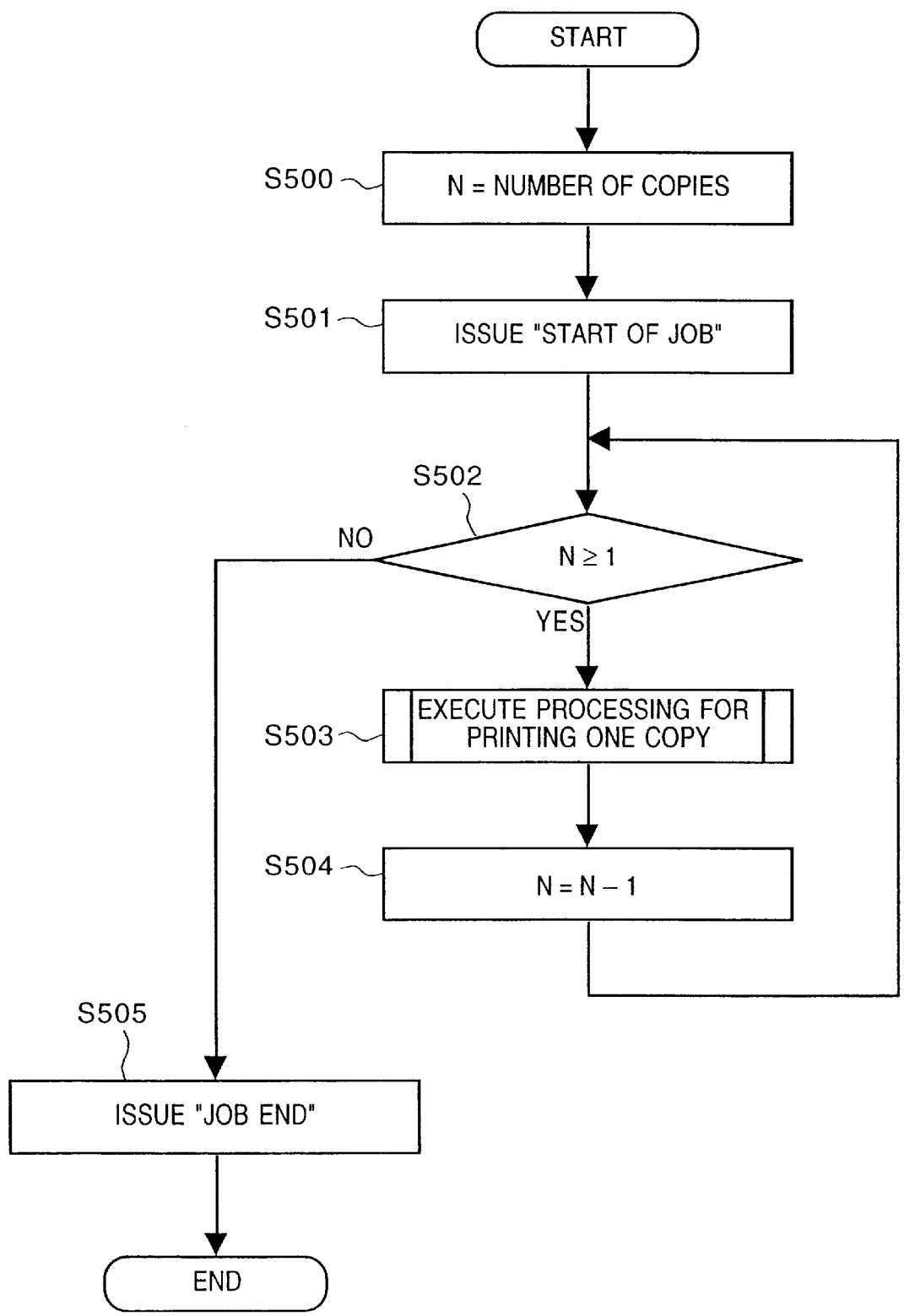
FIG. 5 is a flowchart illustrating a processing procedure for printing on a per-copy basis.

When the spool file manager 304 reads the printing settings that have been registered in the spool file 303 and judges that the printing operation is for printing on a per-copy basis using double-sided printing, the processing of FIG. 5 is started.

A specified number of copies is set to N at step 500, where N represents the number of remaining copies not yet subjected to printing processing. This is followed by step 501, at which "start of job", which indicates the beginning of a job, is sent to the printer, thereby informing the printer of the beginning of one print job. It should be noted that the number of print copies specified at the time of printing is assumed to be one or more.

It is determined at step 502 whether N is equal to or greater than 1. If N is less than 1, it is construed that processing of the specified number of copies has been completed and processing is therefore terminated. If N is equal to or greater than 1, processing for printing one copy is performed at step 503, the number of remaining copies is reduced by one at step 504 and control returns to step 502. By thus executing processing for the printing of one copy at step 503 a number of times equivalent to the number of copies specified, printing on a per-copy basis is carried out. When printing of the document of the specified number of copies has been completed, "job end" is issued to notify the printer of the end of the single print job.

Figure 6:
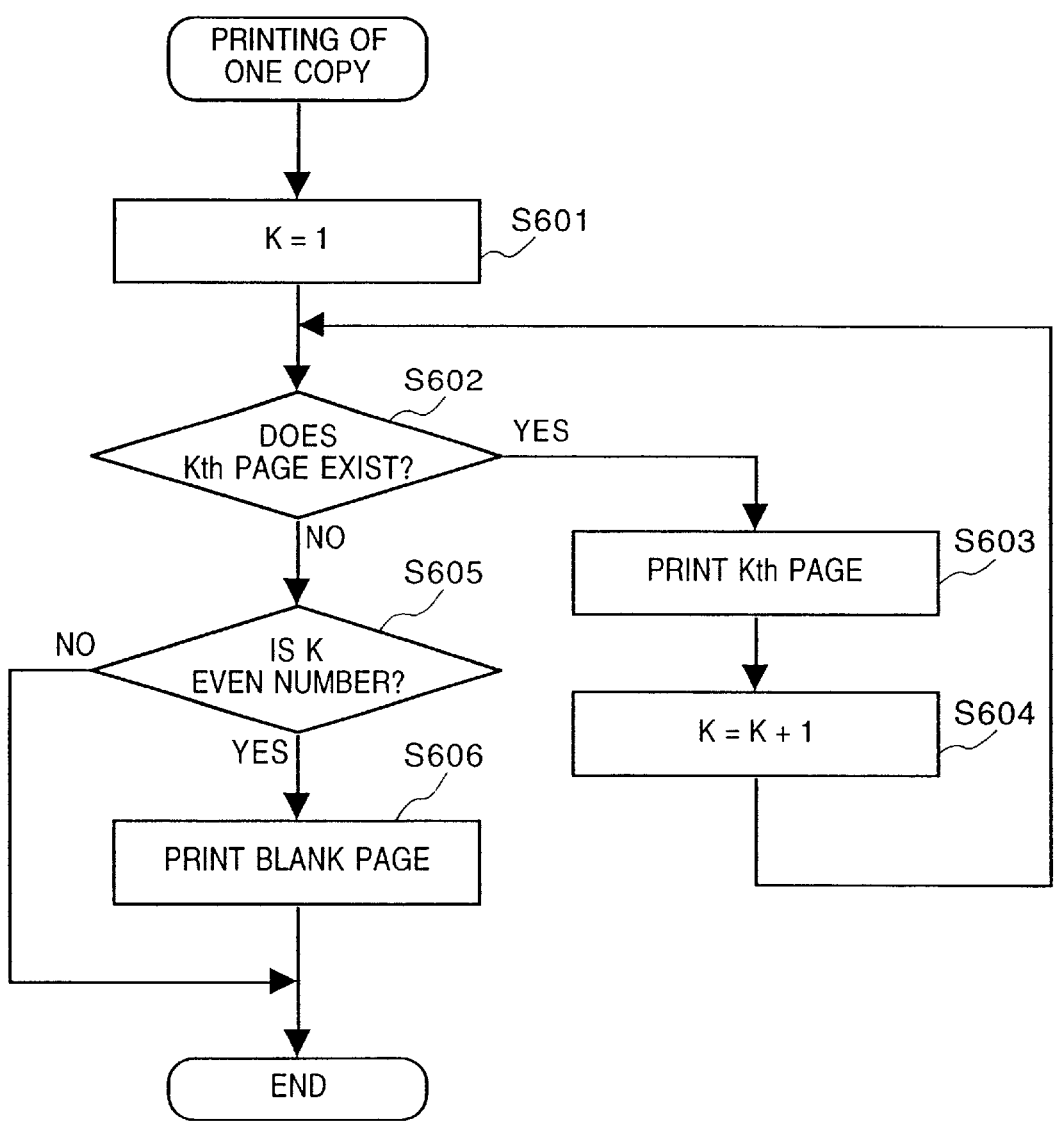
FIG. 6 is a flowchart illustrating a processing procedure for printing each set of copies in the printing of individual sets of copies.

FIG. 6 is a flowchart illustrating the processing of step 503 in FIG. 5. Step 601 calls for K, which indicates the page number of the page currently being processed, to be set to 1 so that the processing of the first page may be started. This is followed by step 602, at which it is determined whether the Kth page exists. If the answer is "YES", the despooler 305 is instructed to print the page at step 603. When the processing of the Kth page is finished, the value of K is incremented at step 604 and control returns to step 602 so that the next page may be processed. If it is judged at step 602 that the Kth page does not exist, then it is determined at step 605 whether K is an even number, i.e., whether the side of the sheet of printing paper is the reverse side. If it is found that K is not even (that it is not on the reverse side), this means that the (K−1)th page is even (that it is on the reverse side) and that this is the last page of this set of copies. Processing for printing one copy of the document is, therefore, terminated as is. On the other hand, if K is found to be an even number at step 605, then the Kth page will fall on the reverse side of a sheet of paper printed on both sides. Moreover, the Kth page does not exist. A blank page, therefore, is printed as the Kth page.

Thus, in a case where the number of pages in one set of copies is odd, a blank page is inserted as the reverse side of the last sheet of paper of the set of copies, whereby it is possible to obtain the output result of the printing control system according to the embodiment shown in FIG. 4B. A double-sided printed product grouped as separate sets of copies can thus be output regardless of whether the number of pages of each set of copies is odd or even.

Further, by implementing the individual printing of a plurality of copies through a single print job, printing can be canceled or suspended in the same manner as an ordinary single job. It is also possible to prevent the inclusion of another print job between local print jobs during printing on a per-copy basis.

Second Embodiment

The expanded system shown in FIG. 3 makes it possible to implement a function through which a plurality of pages (N pages) are reduced in size and printed collectively on a single page. This function shall be referred to as an "N-up" printing function below. The present invention can be applied through the procedure set forth below in case of N-up printing as well. Pages to be printed from an application shall be referred to as "logical pages", and the pages actually output shall be referred to as "physical pages" below. In N-up printing, N logical pages are reduced in size and printed collectively on one physical page. In other words, images in N logical pages are reduced and printed collectively on a sheet of paper in N-up printing.

Figure 7A:
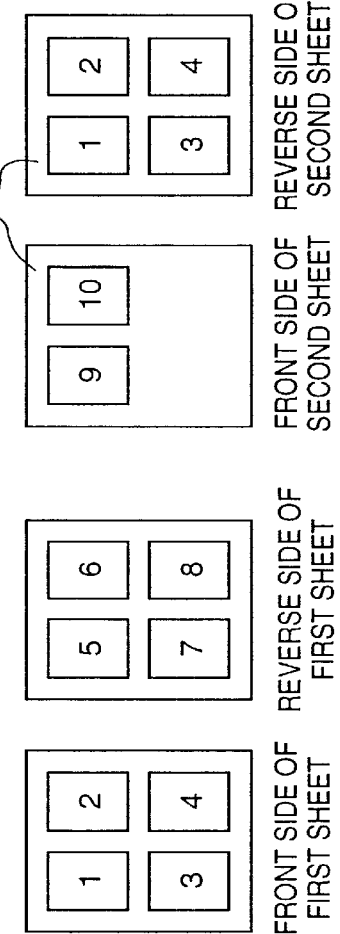
FIG. 7A is a diagram showing an example of an output, according to the prior art, in a case where double-sided printing on a per-copy basis is performed in regard to so-called N-up printing.
Figure 7B:
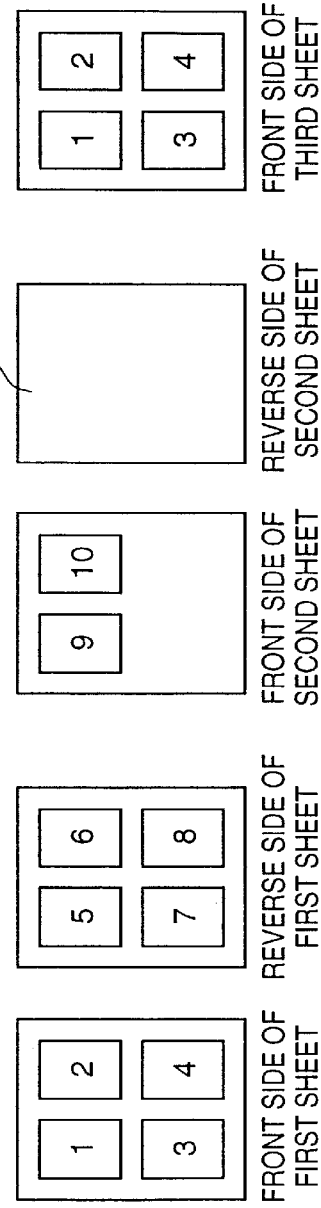
FIG. 7B is a diagram showing an example of an output, by a printing system according to an embodiment of the present invention, in a case where double-sided printing on a per-copy basis is performed in regard to so-called N-up printing.

FIGS. 7A and 7B illustrate examples of outputs obtained by printing on a per-copy basis according to a conventional application and according to the printing control system of this invention, respectively, when N-up printing has been performed by the expanded method of generating print data shown in FIG. 3. The output result according to the prior art is such that if the total number P of physical pages of one set of copies is odd, the first physical page of the second set of copies will be printed on the reverse side (the reverse side of the second sheet of paper in FIG. 7A) of the last physical page of the first set of copies. As a result, the output product cannot be divided into separate sets of copies. Further, in regard to the front and reverse sides of each sheet of paper in first and second sets of copies, the combination of physical pages printed on these sheets will not be the same for the first and second sets of copies.

By contrast, the output result of the printing control system according to this embodiment shown in FIG. 7B is such that if the total number P of physical pages of one set of copies is odd, a blank page is inserted as the reverse side of the last sheet. As a result, it is so arranged that physical pages belonging to mutually different sets of copies will not be placed on front and reverse sides of the same sheet of paper, thus making it possible to separate an output product into discrete sets of copies. The combination of physical pages printed on the front and reverse sides of each sheet of paper will be the same in all sets of copies.

Figure 8:
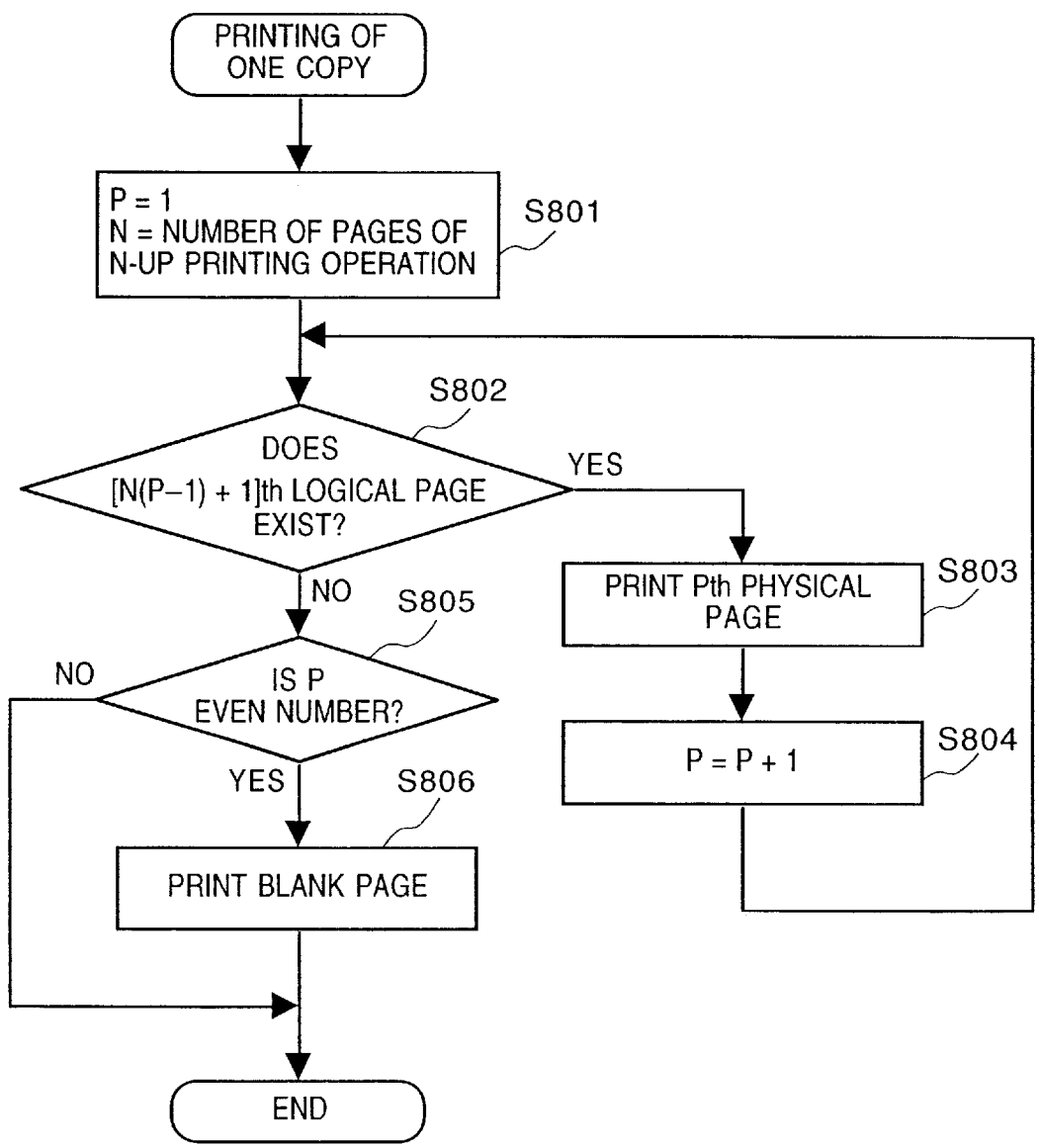
FIG. 8 is a flowchart illustrating a processing procedure for printing each set of copies in the printing of individual sets of copies in so-called N-up printing.

Processing for printing on a per-copy basis at the time of double-sided printing in an N-up printing operation will now be described in detail. FIGS. 5 and 8 are control procedures executed by the spool file manager 304.

When the spool file manager 304 reads the printing settings that have been registered in the spool file 303 and judges that the printing operation is for printing on a per-copy basis using double-sided printing, the processing of FIG. 5 is started in the same manner as described in connection with the first embodiment. However, in a case where N-up printing has been specified by the printing settings, the processing executed at step 503 is not that of FIG. 6 but that indicated by the flowchart of FIG. 8.

Step 801 in FIG. 8 calls for P, which indicates the physical page number of the physical page currently being processed, to be set to 1 so that the processing of the first physical page may be started. Here N is set to the number N of logical pages laid out on each physical page of the N-up printing operation. (For example, in case of 4-up printing in which four pages are reduced to the size of one page, N=4 will hold.)

This is followed by step 802, at which it is determined whether a [N(P−1)+1]th logical page exists. Here [N(P−1)] signifies the number of logical pages that were finished being printed up to the (P−1) th physical page. Accordingly, the above-mentioned value obtained by adding on +1 signifies the first logical page placed on the Pth physical page. If this logical page exists, it is necessary to print the Pth physical page. If it does not exist, it is unnecessary to print the Pth physical page and the (P−1) physical page is the last page of the set of copies.

If the decision rendered at step 802 is "YES", the despooler 305 is instructed to print the Pth physical page at step 803 because this physical page exists. When the processing of the Pth physical page is finished, the value of P is incremented at step 804 and control returns to step 802 so that the next page may be processed.

If it is judged at step 802 that the [N(P−1)+1]th logical page does not exist, then it is determined at step 805 whether P is an even number, i.e., whether the side of the sheet of printing paper is the reverse side. If P is found to be even, this means that the Pth page falls on the reverse side of a sheet of paper printed on both sides. Moreover, the Pth physical page does not exist. A blank page, therefore, is "printed" as the Pth page.

Thus, in the case of N-up printing as well, when the number of pages in one set of copies is odd, a blank page is inserted as the reverse side of the last sheet of paper of the set of copies, whereby it is possible to obtain the output result of the printing control system according to the embodiment shown in FIG. 7B. Thus, in a case where printed matter of a desired number of sets of copies is output while being separated into the individual sets of copies one at a time by repeatedly issuing a print request from a host computer or the like, printed matter in which each set of copies is separate of other sets and in which each of the sets of copies have the same format can be obtained regardless of the number of pages in one set of copies.

Further, by implementing the individual printing of a plurality of copies through a single print job, printing can be canceled or suspended in the same manner as an ordinary single job. It is also possible to prevent the inclusion of another print job between local print jobs during printing on an individual copy basis.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system or the like working on the computer performs a part of or the entire process in accordance with the designation of program codes and implements the functions according to the embodiments.

The present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, in accordance with the present invention, as described above, when print data consisting of an odd number of pages has been output using the double-sided printing function of a printing apparatus, it is so arranged that the boundary between one set of copies and another will not fall on the same sheet of paper, and printing is performed in such a manner that it is possible for the output product to be separated into discrete sets of copies.

Further, in a case where the printing apparatus also has a function for reducing a plurality of pages to the size of one page, it is so arranged that the boundary between one set of copies and another will not fall on the same sheet of paper, and printing is performed in such a manner that it is possible for the output product to be separated into discrete sets of copies.

Further, by implementing the individual printing of a plurality of copies through a single print job, printing can be canceled or suspended in the same manner as an ordinary single job. It is also possible to prevent the inclusion of another print job between local print jobs during printing on an individual copy basis.

As many apparently widely different embodiments of the present invention can be made without departing from the spirit and scope thereof, it is to be understood that the invention is not limited to the specific embodiments thereof except as defined in the appended claims.

What is claimed is:

1. A printing control apparatus for generating a print job to be transmitted to a printing apparatus that prints on front and reverse sides of a printing medium, in order, said print control apparatus comprising:

a storage unit adapted to store print data of a document to be printed; and a job generation unit adapted to read the print data from said storage unit, to insert a blank page on a reverse side of a printing medium when a final page of the document falls on a front side of the printing medium, and to generate a print job to be transmitted to the printing apparatus by issuing job end data according to a printing setting, wherein said job generation unit generates a print job by inserting a blank page to a reverse side of a final page of each copy of the document in a case where a printing setting of the document designates a number of copies to be printed is two or more and printing on both sides of the printing medium.

2. A printing control apparatus according to claim 1, wherein said storage unit stores the print data in a form of intermediate data.

3. A printing control apparatus according to claim 1, further comprising an acquisition unit adapted to acquire a printing setting from a printer driver.

4. A printing control apparatus according to claim 1, wherein said job generation unit converts the print data read from said storage unit into a first rendering function, outputs the first rendering function to a graphic engine of an operating system, and generates a print job based upon a second rendering function acquired from the operating system in response to the first rendering function.

5. A printing control apparatus according to claim 1, further comprising:
an acceptance unit adapted to accept the printing setting, including an N-up arrangement indicating that each of N pages inputted from an application program is reduced and arranged on a side of the print medium,
wherein said job generation unit inserts a blank page to the reverse side of the final page of the document to be printed when the final page of the document falls on a front side as a result of the N-up arrangement.

6. A printing control apparatus according to claim 1, wherein said printing control apparatus is a host computer.

7. A printing control method for generating a print job to be transmitted to a printing apparatus that prints on front and reverse sides of a printing medium, in order, said method comprising:
a storage step of storing, in a storage unit, print data of a document to be printed;
a read step of reading the print data from the storage unit;
a page insertion step of inserting a blank page on a reverse side of a printing medium if a final page of the document falls on a front side of the printing medium; and
a print job generation step of generating a print job to be transmitted to the printing apparatus by issuing job end data according to a printing setting,
wherein a print job is generated in said print job generation step by inserting a blank page to a reverse side of a final page of each copy of the document in a case where a printing setting of the document designates a number of copies to be printed is two or more and printing on both sides of the printing medium.

8. A printing control method according to claim 7, wherein the print data is stored in the storage unit in a form of intermediate data.

9. A printing control method according to claim 7, further comprising an acquisition step of acquiring a printing setting from a printer driver.

10. A printing control method according to claim 7, wherein, in said print job generation step, the print data read from the storage unit is converted into a first rendering function, the first rendering function is outputted to a graphic engine of an operating system, and a print job is generated based upon a second rendering function acquired from the operating system in response to the first rendering function.

11. A printing control method according to claim 7, further comprising:
an acceptance step of accepting the printing setting, including an N-up arrangement indicating that each of N pages inputted from an application program is reduced and arranged on a side of the print medium,
wherein, in said print job generation step, a blank page is inserted to the reverse side of the final page of the document to be printed when the final page of the document falls on a front side as a result of the N-up arrangement.

12. A printing control method according to claim 7, wherein said printing control method is performed by a host computer.

13. A computer program product embodying a program for implementing a method of causing a computer to generate a print job to be transmitted to a printing apparatus that prints on front and reverse sides of a printing medium, in order, the method comprising:
a storage step of storing, in a storage unit, print data of a document to be printed;
a read step of reading the print data from the storage unit;
a page insertions step of inserting a blank page on a reverse side of a printing medium if a final page of the document falls on a front side of the printing medium; and
a print job generation step of generating a print job to be transmitted to the printing apparatus by issuing job end data according to a printing setting,
wherein a print job is generated in the print job generation step by inserting a blank page to a reverse side of a final page of each copy of the document in a case where a printing setting of the document designates a number of copies to be printed is two or more and printing on both sides of the printing medium.

14. A computer program product according to claim 13, wherein the print data is stored in the storage unit in a form of intermediate data.

15. A computer program product according to claim 13, wherein the method further comprises an acquisition step of acquiring a printing setting from a printer driver.

16. A computer program product according to claim 13, wherein, in the print job generation step, the print data read from the storage unit is converted into a first rendering function, the first rendering function is outputted to a graphic engine of an operating system, and a print job is generated based upon a second rendering function acquired from the operating system in response to the first rendering function.

17. A computer program product according to claim 13, wherein the method further comprises:
an acceptance step of accepting the printing setting, including an N-up arrangement indicating that each of N pages inputted from an application program is reduced and arranged on a side of the print medium,
wherein, in the print job generation step, a blank page is inserted to the reverse side of the final page of the document to be printed when the final page of the document falls on a front side as a result of the N-up arrangement.

18. A printing control apparatus for generating a print job to be transmitted to a printing apparatus that prints on front and reverse sides of a printing medium, in order, said print control apparatus comprising:
storage means for storing print data of a document to be printed; and
job generating means for reading the print data out of said storage means, inserting a blank page on a reverse side of a printing medium if a final page of the document falls on a front side of the printing medium, and generating a print job to be transmitted to the printing apparatus by issuing job end data according to a printing setting,
wherein said job generating means generates a print job by inserting a blank page to a reverse side of a final page of each copy of the document in a case where a printing setting of the document designates a number of copies to be printed is two or more and printing on both sides of the printing medium.

19. A printing control apparatus according to claim 18, wherein said storage means stores the print data in a form of intermediate data.

20. A printing control apparatus according to claim 18, further comprising acquisition means for acquiring a printing setting from a printer driver.

21. A printing control apparatus according to claim 18, wherein said job generating means converts the print data read from said storage means into a first rendering function, outputs the first rendering function to a graphic engine of an operating system, and generates a print job based upon a second rendering function acquired from the operating system in response to the first rendering function.

22. A printing control apparatus according to claim 18, further comprising:

acceptance means for accepting the printing setting, including an N-up arrangement indicating that each of N pages inputted from an application program is reduced and arranged on a side of the print medium, wherein said job generating means inserts a blank page to the reverse side of the final page of the document to be printed when the final page of the document falls on a front side as a result of the N-up arrangement.

23. A printing control apparatus according to claim 18, wherein said printing control apparatus is a host computer.

24. A printing control apparatus for generating a print job to be transmitted to a printing apparatus that prints on front and reverse sides of a printing medium, said print control apparatus comprising:

spooling means for spooling print data of a document to be printed in a spool file; and job generation means for reading the print data from the spool file and for generating a print job to be transmitted to the printing apparatus by issuing job end data according to a printing setting, wherein said job generation means inserts a blank page into a position between copies of the document in a case in which a final page of the document occurs on a front side of the printing medium and a printing setting of the document designates a number of copies to be printed is two or more and printing on both sides of the printing medium.

25. A printing control apparatus according to claim 24, wherein said spooling means spools the print data of the document in a form of intermediate data in the spool file.

26. A printing control apparatus according to claim 24, further comprising acquisition means for acquiring a printing setting set for a printer driver.

27. A printing control apparatus according to claim 24, wherein said job generation means converts the print data read from the spool file into a first rendering function, outputs the first rendering function to a graphic engine of an operating system, and generates a print job based on a second rendering function acquired from the operating system in response to the first rendering function.

28. A printing control apparatus according to claim 24, further comprising acceptance means for accepting the printing setting including an N-up arrangement indicating that each of N pages inputted from an application program is reduced and arranged on a side of the print medium, wherein said job generation means inserts a blank page to a position between copies of the document to be printed in a case in which the final page of the document occurs on the front side as a result of the N-up arrangement and the printing setting of the document designates a number of copies to be printed is two or more and printing on both sides of the printing medium.

29. A printing control method for generating a print job to be transmitted to a printing apparatus that prints on front and reverse sides of a printing medium, said printing control method comprising the steps of:

spooling print data of a document to be printed in a spool file;

reading the print data from the spool file; and generating a print job to be transmitted to the printing apparatus by issuing job end data according to a printing setting, wherein said generating step inserts a blank page to a position between copies of the document in a case in which a final page of the document occurs on a front side of the printing medium and a printing setting of the document designates a number of copies to be printed is two or more and printing on both sides of the printing medium.

30. A printing control method according to claim 29, wherein said spooling step spools the print data of the document in a form of intermediate data in the spool file.

31. A printing control method according to claim 29, further comprising the step of acquiring a printing setting set for a printer driver.

32. A printing control method according to claim 29, wherein said generating step converts the print data read from the spool file into a first rendering function, outputs the first rendering function to a graphic engine of an operating system, and generates a print job based on a second rendering function acquired from the operating system in response to the first rendering function.

33. A printing control method according to claim 29, further comprising the step of accepting the printing setting including an N-up arrangement indicating that each of N pages inputted from an application program is reduced and arranged on a side of the print medium, wherein said generating step inserts a blank page to a position between copies of the document to be printed in a case in which the final page of the document occurs on the front side as a result of the N-up arrangement and the printing setting of the document designates a number of copies to be printed is two or more and printing on both side of the printing medium.

34. A computer program product embodying a program for implementing a printing control method of causing a computer to generate a print job to be transmitted to a printing apparatus that prints on front and reverse sides of a printing medium, said method comprising the steps of:

spooling print data of a document to be printed in a spool file;

reading the print data from the spool file; and generating a print job to be transmitted to the printing apparatus by issuing job end data according to a printing setting, wherein said generating step inserts a blank page to a position between copies of the document in a case in which a final page of the document occurs on a front side of the printing medium and a printing setting of the document designates a number of copies to be printed is two or more and printing on both sides of the printing medium.

35. A computer program product according to claim 34, wherein said spooling step spools the print data of the document in a form of intermediate data in the spool file.

36. A computer program product according to claim 34, further comprising the step of acquiring a printing setting set for a printer driver.

37. A computer program product according to claim 34, wherein said generating step converts the print data read from the spool file into a first rendering function, outputs the first rendering function to a graphic engine of an operating system, and generates a print job based on a second rendering function acquired from the operating system in response to the first rendering function.

38. A computer program product according to claim 34, further comprising the step of accepting the printing setting including an N-up arrangement indicating that each of N pages inputted from an application program is reduced and arranged on a side of the print medium, wherein said generating step inserts a blank page to a position between copies of the document to be printed in a case in which the final page of the document occurs on the front side as a result of the N-up arrangement and a printing setting of the document designates a number of copies to be printed is two or more and printing on both sides of the printing medium.

* * * * *

UNITED STATES PATENT AND TRADEMARK OFFICE
CERTIFICATE OF CORRECTION

PATENT NO. : 6,690,477 B2
DATED : February 10, 2004
INVENTOR(S) : Koji Nakagiri et al.

It is certified that error appears in the above-identified patent and that said Letters Patent is hereby corrected as shown below:

Title page,
Item [62], Related U.S. Application Data, "1998," should read -- 1998, now Patent No. 6,313,919. --.

Column 1,
Line 5, "1998." should read -- 1998, now Patent No. 6,313,919. --.

Column 5,
Line 7, "I" should read -- Is --.

Column 15,
Line 38, "designates" should read -- designating --.

Column 16,
Lines 18 and 62, "designates" should read -- designating --.

Column 17,
Line 38, "designates" should read -- designating --.

Column 18,
Lines 13, 37 and 56, "designates" should read -- designating --.

Column 20,
Line 5, "designates" should read -- designating --.

Signed and Sealed this

Seventh Day of September, 2004

JON W. DUDAS
*Director of the United States Patent and Trademark Office*